United States Patent [19]

Agosta

[11] Patent Number: 4,684,419
[45] Date of Patent: Jul. 4, 1987

[54] METHOD AND APPARATUS FOR FORMING AUTOMOBILE CONVERTIBLE TOPS

[75] Inventor: Roy P. Agosta, Mission Hills, Calif.
[73] Assignee: Robbins Auto Top Co., Inc., Santa Monica, Calif.
[21] Appl. No.: 881,601
[22] Filed: Jul. 3, 1986
[51] Int. Cl.$^4$ .................. B32B 31/12; B32B 7/08
[52] U.S. Cl. .................. 156/93; 156/201; 156/202; 156/461; 156/464; 428/104
[58] Field of Search ............ 156/93, 201, 202, 461, 156/464; 428/104

[56] References Cited

U.S. PATENT DOCUMENTS

| T926,010 | 9/1974 | Elliott et al. | 156/202 |
|---|---|---|---|
| 3,558,382 | 1/1971 | Doerer | 156/93 |
| 4,186,043 | 1/1980 | Zeigler et al. | 156/202 X |
| 4,218,278 | 8/1980 | McMackin et al. | 156/202 X |
| 4,488,927 | 12/1984 | Hooper | 156/464 |
| 4,508,582 | 4/1985 | Fink | 156/93 |

Primary Examiner—Robert A. Dawson
Attorney, Agent, or Firm—Kelly, Bauersfeld & Lowry

[57] ABSTRACT

An improved method and related apparatus are provided for making convertible top for automobiles and the like, wherein top deck and side quarter panels of fabric-based material cooperatively form rain gutters extending along the opposite sides of the top deck panel. The top deck and each side quarter panel for a convertible top are initially sewn together in overlying relation near one side margin whereupon the side margin is folded over with the side quarter panel folded back upon itself to define a pair of directly overlying side edge strips. This folded side margin is advanced through a folding fixture adapted to insert an elongated rod substantially into the base of the fold between the side edge strips of the side quarter panel. An adhesive material is applied between the side edge strips which are then pressed together to obtain a secure bond therebetween and to lock the rod in place. The top deck panel is then unfolded from the assembly leaving its sewn marginal edge overlapping the folded-over edge strips of the side quarter panel, all of which are then securely bonded in stacked relation by a heat sealing process or the like. The top deck and side quarter panels are thus securely joined, with the captured elongated rod forming an elongated raised bead extending along and cooperating with the top deck panel to define the rain gutter.

20 Claims, 12 Drawing Figures

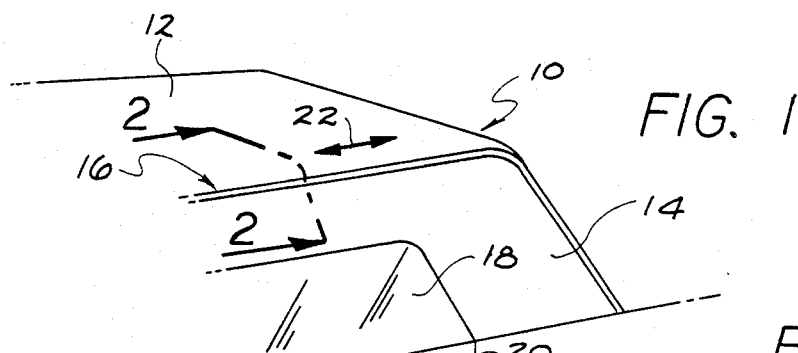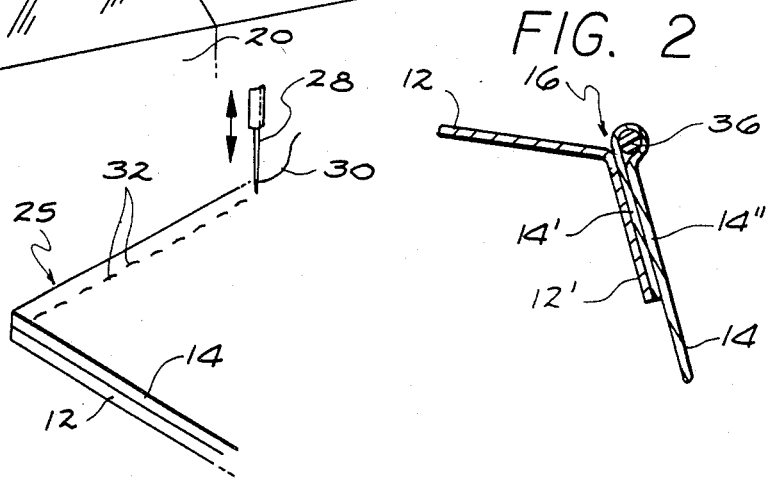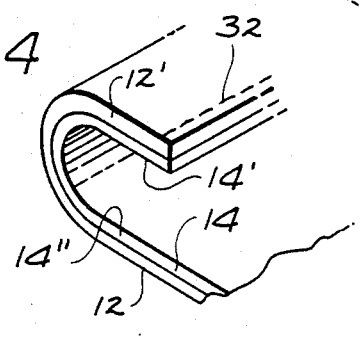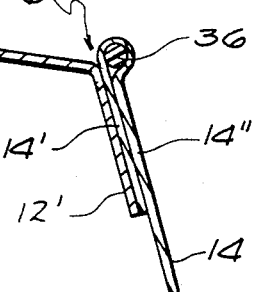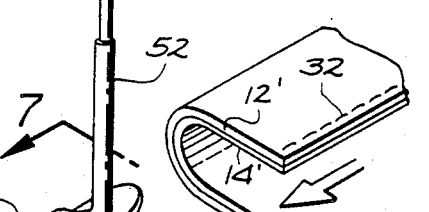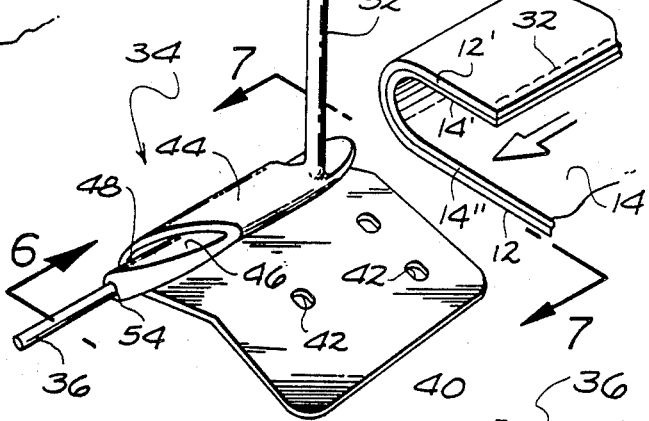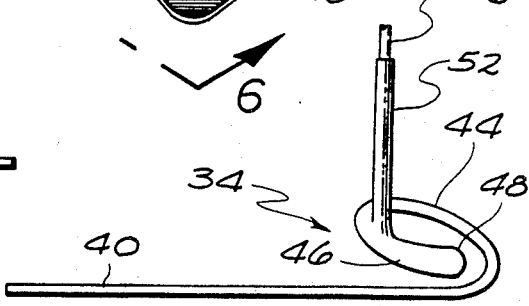

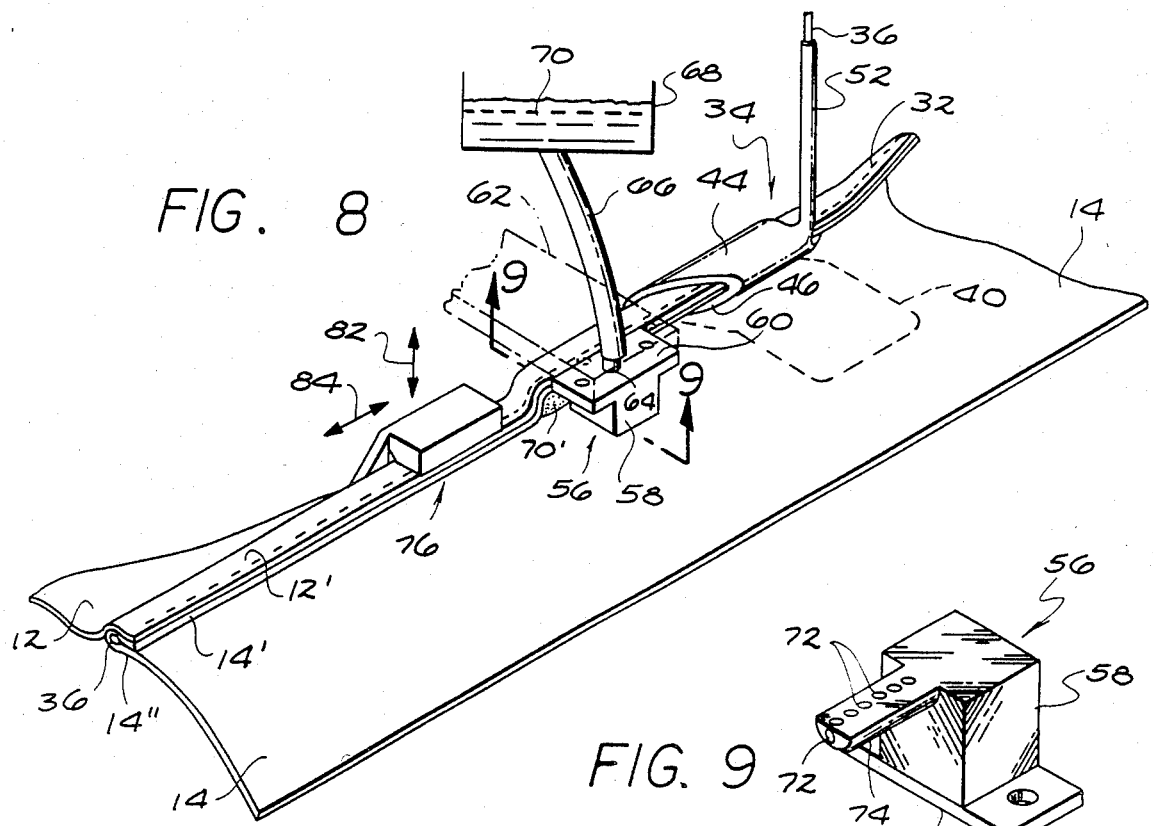
FIG. 8
FIG. 9
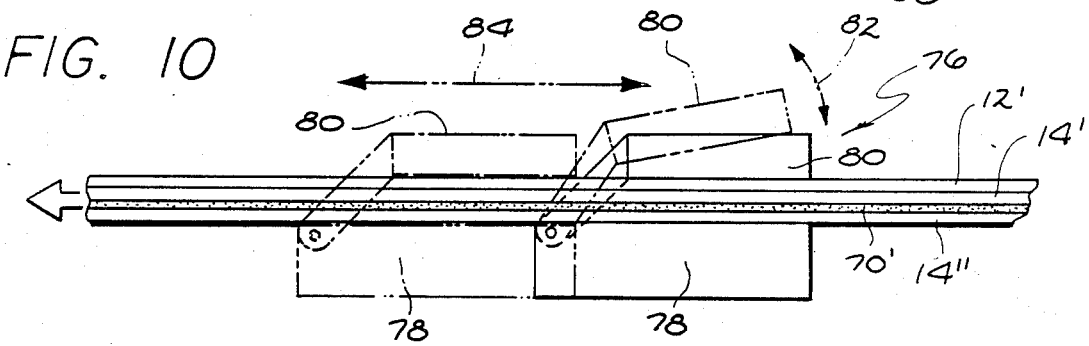
FIG. 10
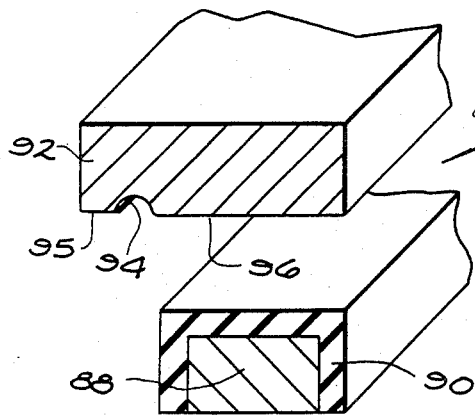
FIG. 11
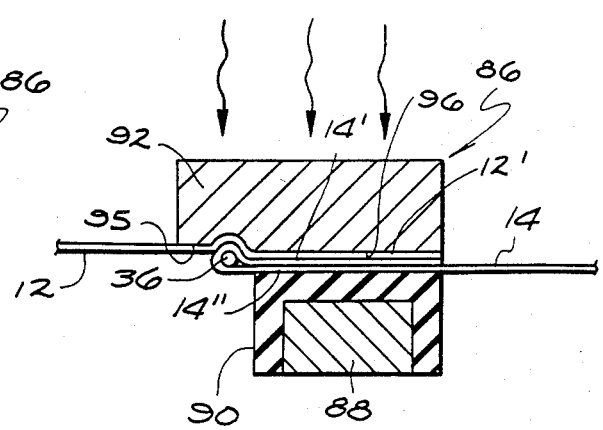
FIG. 12

METHOD AND APPARATUS FOR FORMING AUTOMOBILE CONVERTIBLE TOPS

BACKGROUND OF THE INVENTION

This invention relates generally to improvements in the manufacture of fabric-based protective coverings particularly of the type used to form so-called convertible tops for automobiles and the like. More specifically, this invention relates to improved methods and related apparatus for making a convertible top or the like of the type having integrally formed rain gutters for controlled drainage of rainwater and the like from the top.

Fabric-based protective coverings in general are well known in the art for use in temporarily sheltering persons and/or equipment from exposure to rain, wind, sun, and the like. For example, such protective coverings have been popularly used for many years with automobiles to form a so-called convertible top which can be erected when desired to shield and protect vehicle occupants. During selected fair weather conditions, the convertible top can be lowered or otherwise removed and stored to expose the occupants of the vehicle to direct sunlight, etc., thereby enhancing the recreational or other desired uses of the vehicle.

Convertible tops for automobiles have been traditionally constructed from canvas or other fabric-based material mounted upon an articulated skeletal frame adapted for relatively rapid deployment between a raised position enclosing an underlying vehicle passenger compartment and a stored position opening the top of said passenger compartment. The fabric-based top is typically constructed from a top deck panel of the fabric material which is sewn or otherwise attached along its side margins to a repsective pair of side quarter panels, wherein the assembled panels are shaped to stretch relatively taut upon the frame in the raised position and to form a vehicle top compatible with the particular vehicle model and style. In recent years, the fabric-based material used in forming the top has included a vinyl or other substantially waterproof outer layer for increased protection of the vehicle occupants.

One disadvantage encountered with traditional convertible tops for automobiles, however, relates to the absence of structural means for draining rainwater and the like away from windows and doors along the sides of the vehicle. That is, rainwater and the like tends to drain from the top deck panel toward the sides of the convertible top where it can fall directly onto passenger windows and doors. When a window or door is opened, a significant quantity of rainwater can fall into the vehicle or onto a passenger.

Some improved convertible tops have been designed to include integrated troughs or rain gutters extending along the side margins of the top deck panel, thereby draining water toward the front or rear of the vehicle in a direction away from underlying passenger windows and doors. However, such convertible top designs have required extensive manual labor and skill to interconnect the top deck and side quarter panels in a manner defining the desired rain gutters. Moreover, such convertible top constructions have not consistently provided adequate connection strength between the top deck and side quarter panels, resulting in occasional undesired separation of those panels.

There exists, therefore, a significant need for an improved methods and related apparatus for forming an automobile convertible top or the like of the type having integrated rain gutters along the opposite sides of a top deck panel, wherein the convertible top can be produced at a relatively rapid production rate and with a high strength interconnection between top deck and side quarter panels. The present invention fulfills these needs and provides further related advantages.

SUMMARY OF THE INVENTION

In accordance with the invention, an improved method and apparatus are provided for forming fabric-based protective coverings particularly such as convertible tops for automobiles and the like. The invention provides a relatively high strength interconnection between top deck and side quarter panels of the convertible top, wherein these panels cooperatively define rain gutters for controlled drainage of rainwater and the like. The invention accommodates such interconnection of the top deck and side quarter panels at a relatively high production rate, and without requiring extensive manual labor or manual skill.

In accordance with one preferred form of the invention, the top deck panel and side quarter panels for a convertible top are formed from a fabric-based material having a substantially waterproof outer coating of vinyl or the like. The top deck panel is attached to each of the side quarter panels by sewing near a common side margin thereof with their vinyl-coated outer sides in face-to-face relation. The sewn side margin is then folded back upon itself in a manner folding the side quarter panel to define a pair of narrow side edge strips in direct overlying relation. The thus-folded side margin is advanced through a folding fixture including means for feeding and inserting an elongated rod substantially into the base of the fold between the side edge strips of the side gutter panel. A contoured foot feeds a selected adhesive material between the two side edge strips, and a reciprocating hammer/anvil unit presses these edge strips together to achieve intimate connection therebetween. As a result, the elongated rod is locked within an elongated packet to form a raised bead substantially at the base of the folded-over edge strips of the side quarter panel.

The top deck panel is unfolded from the resultant subassembly leaving its sewn marginal edge overlapping the folded-over side edge strips of the side quarter panel. The stacked marginal edge of the top deck panel and the folded over edge strips of the side quarter panel are then subjected to a heat sealing step or the like including, for example, heat and pressure for securely bonding the face-to-face vinyl coatings or the like on the top deck and side quarter panels. In addition, this heat sealing step enhances the bond between the folded-over edge strips of the side quarter panel, for example, when a hot melt or other thermally activated adhesive material is used.

The resultant interconnection between the top deck and a pair of the side quarter panels provides the raised beads extending along the opposite sides of the top deck panel. These raised beads cooperate with the top deck panel to define shallow, longitudinally extending troughs which function as effective rain gutters to drain rainwater and the like away from underlying passenger doors and windows.

Other features and advantages of the present invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 1 is a fragmented perspective view illustrating an improved automobile convertible top formed in accordance with the invention;

FIG. 2 is an enlarged fragmented sectional view taken generally on the line 2—2 of FIG. 1;

FIG. 3 is an enlarged fragmented perspective view illustrating top deck and side quarter panels for a convertible top sewn together along a common side margin in face-to-face relation;

FIG. 4 is a fragmented perspective view illustrating the top deck and side quarter panels folded over at the sewn side margin;

FIG. 5 is a fragmented perspective view illustrating advancement of the folded-over sewn margin through a folding fixture embodying novel features of the invention;

FIG. 6 is an end elevation view of the folding fixture taken generally on the line 6—6 of FIG. 5;

FIG. 7 an end elevation view of the folded fixture taken generally on the line 7—7 of FIG. 5;

FIG. 8 is a fragmented and partially diagrammatic perspective view illustrating further advancement of the folded-over sewn margin into association with adhesive material feed means and a reciprocating hammer/anvil unit;

FIG. 9 is an enlarged inverted perspective view illustrating one preferred form for a contoured feed foot forming a portion of the adhesive material feed means;

FIG. 10 is a somewhat diagramatic view illustrating operation of the reciprocating hammer/anvil unit;

FIG. 11 is an enlarged fragmented perspective view illustrating heat sealing means; and FIG. 12 is a fragmented sectional view illustrating operation of the heat sealing means.

DETAILED DESCRIPTION OF THE PREFERRED EMBODIMENT

As shown in the exemplary drawings, an improved method and apparatus are provided for forming an automobile convertible top referred to generally in FIG. 1 by the reference numeral 10. The convertible top comprises a top deck panel 12 joined along its laterally opposite sides to a pair of side quarter panels 14, with one of said adjoining side quarter panels 14 being depicted in FIG. 1. The top deck and side quarter panels 12 and 14 cooperatively define shallow rain gutters or troughs 16 which extend along the sides of the top deck panel 12 for draining rainwater longitudinally away from an underlying passenger window 18 and/or associated door 20.

The improved method and apparatus of the present invention provides a relatively high strength interconnection between the top deck panel 12 and the side quarter panels 14 which incorporate the integrally-formed rain gutters 16. This top geometry is advantageously constructed relatively quickly and accurately and with process steps consistent with relatively high rate production. Extensive manual labor and manual skill are not required to form interconnection. Moreover, while the invention will be described with respect to forming a convertible top 10 for automobiles and the like, it will be understood that the invention is applicable for other types of protective fabric-based coverings designed to shield persons and/or equipment from rain, sun, wind, and the like.

As shown generally in FIG. 1, the convertible top 10 is depicted in a raised or operational position supported substantially taut upon a conventional folding convertible top frame (not shown). In this raised position, the top deck panel 12 provides a protective rooflike covering over a vehicle passenger compartment to protect and shield passengers from rain and the like. The opposite sides of the top deck panel 12 are joined to the side quarter panels 14 which extend downwardly toward interfitting relation with the vehicle body and associated windows 18 and doors 20 at the sides of the vehicle. The rain gutters 16 drain rainwater and the like generally longitudinally, toward the front or rear of the vehicle, as depicted by arrow 22 in FIG. 1, to prevent such water from draining transversely onto the side quarter panels 14 where is could otherwise fall onto a vehicle passenger or into the vehicle, or example, when the underlying window or door is opened.

The improved method and related apparatus of the present invention are shown in more detail in FIGS. 3-12 with respect to one side quarter panel 14, with the interconnection of the top deck panel 12 to the other side quarter panel 14 being accomplished in the same manner to produce a mirror image geometry. More particularly, as shown in FIG. 3, the top deck and side quarter panels 12 and 14 are arranged in overlying relation with their respective side margins in substantial alignment with each other, as indicated by arrow 25. The panels 12 and 14 are oriented in face-to-face relation with their outer sides presented inwardly toward each other. In this regard, the panels 12 and 14 conventionally comprise a selected fabric-based material such as canvas or the like having a thin outer waterproof coating of vinyl or other selected water impervious substance preferably having heat sealing capability as will be described in more detail. Accordingly, the outer vinyl-coated sides of the panels are positioned in direct face-to-face abutment. The two panels are then sewn together near their common side margin by means of a needle 28 and appropriate thread 30 to define a line of stitches 32 in a relatively close spacing from the common side margin of the panels.

As shown in FIG. 4, the sewn and overlying top deck and side quarter panels 12 and 14 are folded in the region along their common side margin in a direction folding portions of the side quarter panel 14 directly back upon itself. These folded-over portions of the side quarter panel 14 thus define a longitudinally extending and directly overlying pair of narrow side edge strips 14' and 14", in stacked relation sandwiched between a marginal edge 12' of the top deck panel 12 and the remainder of the top deck panel. The folded region of the panels 12 and 14 is then advanced through a folding fixture 34 as shown in FIGS. 5-8. In accordance with one primary aspect of the invention, this folding fixture 34 is designed for simultaneous feeding of an elongated flexible rod 36 substantially into the base of the fold defined between the side edge strips 14' and 14" of the side quarter panel 14, as referred to generally by arrow 38 in FIG. 6.

More specifically, the folding fixture 34 comprises an enlarged baseplate 40 having openings 42 formed therein to permit secure attachment by screws or the like (not shown) onto appropriate processing machinery. One side of the baseplate 40 is rolled upwardly and back upon itself to define a curved upper guide vane 44. This upper guide vane 44 in turn is rolled downwardly and foled back beneath itself to define an integral, intermediate guide vane 46 having an elongated distal margin 48 in spaced relation with the curved juncture between the baseplate 40 and the upper guide vane 44. The upper and intermediate guide vanes 44 and 46 are smoothly and curvedly contoured at their leading and trailing edges to permit smooth passage of the folded-over panels 12 and 14 through a longitudinally open, generally U-shaped cavity defined by the vanes.

A rod feed tube 52 upstands from the intermediate guide vane 46 near the leading edge thereof and defines a small bore passage with an open inlet end for receiving the elongated rod 36. In the preferred form, this elongated rod 36 is constructed from an extruded flexible plastic material or the like to have a diameter somewhat greater than the thickness of the panels 12 or 14 and is fed from a suitable supply reel (not shown) into the feed tube 52 simultaneously with passage of the folded-over panels through the U-shaped fixture cavity. Importantly, the rod 36 is passed continuously through the feed tube 52 and further through a blind passageway formed in the intermediate guide vane 46 to exit said passageway through an outlet port 54 positioned generally at the base of the fold formed by the panels 12 and 14, as shown best in FIGS. 5 and 6. Accordingly, the rod 36 extends continuously along the base of the fold between the side edge strips 14' and 14" of the side quarter panel.

An adhesive material feed foot 56 is positioned closely downstream relative to the folding fixture 34, as shown in FIGS. 8 and 9. This adhesive material feed foot 56 comprises a hollow body 58 having an upper flange 60 for appropriate attachment to an arm 62 or other support component of a machine frame as depicted in dotted lines in FIG. 8. An inlet port 64 on the hollow body 58 is coupled via a tube 66 or the like to an appropriate resevoir 68 of a selected adhesive material 70, particularly such as a hot melt or other temperature activated adhesive material. The adhesive material 70 is pumped or flows through the tube 66 and the hollow body 58 for discharge via outlet ports 72 in a low profile, contoured projection 74 extending between the folded-over strips 14' and 14" of the side quarter panel 14. The adhesive feed foot 56 thus deposits a continuous, substantially uninterrupted film layer 70' (FIG. 8) of the adhesive material 70 for securing the side edge strips together.

A reciprocating hammer/anvil unit 76 is positioned closely downstream with respect to the adhesive material feed foot 56 and functions to press the folded-over edge strips 14' and 14" on the side quarter panel 14 together thereby securely bonding those portions by means of the adhesive material 70. More particularly, as shown in FIGS. 8 and 10, the hammer/anvil unit 76 comprises a lower anvil 78 positioned beneath the folded panels 12 and 14, in combination with a pivotally supported upper hammer 80. The hammer 80 is displaced by conventional means such as hydraulic or pneumatic components (not shown) to clamp downwardly upon the foled-over panels as illustrated by arrow 82, thereby firmly pressing the folded side edge strips 14' and 14" together with the adhesive material 70 therebetween. When clamped in this manner, the hammer 80 and anvil 78 are then displaced longitudinally through a short increment, as illustrated by arrow 84, to draw the panels through the folding fixutre 34 and past the adhesive material feed foot 56. The hammer 80 is then opened and the unit 76 returned through a short longitudinal stroke for repeated pressing and drawing of the panels. Conveniently, the longitudinal stroke dimensions of the hammer/anvil unit 76 are not greater than the longitudinal dimensions of the hammer 80 and the anvil 78 whereby the folded-over panels are pressed firmly together for the entire lengths thereof. Moreover, one side corner of the hammer 80 and an underlying side corner of the anvil 78 are desirably beveled or otherwise cut back to avoid application of excessive pressure to the rod 36 which is thus locked in place within a longitudinal pocket extending along the panels.

The thus-formed convertible top 10 is then presented to a heat sealing station 86 or the like as shown generally in FIGS. 11 and 12. More specifically, the top deck panel 12 is unfolded from the resultant subassembly leaving the short marginal edge 12' of the top deck panel 12 in overlapping, stacked relation with the side edge strips 14' and 14" of the side quarter panel 14. This interconnection, defined by the stacked panel portions, is seated upon an elongated lower support block 88 with the vinyl coated outer side of the top panel 12 facing downwardly toward the block 88. This lower support block 88 is conveniently covered by an upper sleeve 90 of a resilient or elastomer material for contacting the downwardly presented outer side of the side quarter panel 14. An upper pressure block 92 is pressed downwardly upon the stacked layers to impart heat and/or pressure thereto. This application of heat and pressure provides a secure and permanent heat seal connection between the vinyl coated outer sides of the marginal edge 12' of the top deck panel and the underlying side edge strip 14', while simultaneously heat activating and completing curing of the adhesive material 70 between the folded-over side edge strips 14' and 14" of the side quarter panel. Importantly, the top deck panel 12 beyond the marginal edge 12' is not secured to the portion of the side quarter panel or to the raised bead portion defined by the elongated rod 36 which seats within a nesting pocket 94 within pressure block 92. The remainder of the top deck panel 12 is conveniently guided away from the heat and/or pressure interface along a guide face 95 recessed above a primary pressure face 96 of the upper support block. While the particular form of the heat sealing station 86 may vary, one preferred machine comprises a dielectric heat sealing machine of the type manufactured by Hall High Frequency Technology, Deer Park, N.Y.

Upon removal from the heat sealing station 86, the formed convertible top 10 with side quarter panels secured to the opposite sides thereof can be appropriately mounted onto the articulated frame of a vehicle top assembly. When mounted in this manner, the rod 36 for each side panel 14 is captured between the folded-over edge strips 14' and 14" to define an elongated raised bead extending along the interconnection between the top deck and side quarter panels. As shown best in FIG. 2, this raised bead protrudes a short distance above the adjoining side edge of the top deck panel 12 and thereby cooperates therewith to form the rain gutter 16. This rain gutter 16 quickly and easily drains rainwater from the top deck panel without falling upon the underlying passenger window 18 or door 20.

A variety of further modifications and improvements to the invention described herein are believed to be apparent to those skilled in the art. Accordingly, no limitation on the invention is intended by way of the description and drawings, except as set forth in the appended claims.

What is claimed is:

1. A method of making a convertible top or the like having a top deck panel and a side quarter panel of fabric-based material, said method comprising the steps of:

sewing the top deck panel in face-to-face relation with the side quarter panel with a line of stitches generally near substantially overlying side margins of said panels;

folding a portion of the overlying panels along the sewn side margins back upon itself with said side quarter panel defining a directly overlying pair of side edge strips in stacked relation between a marginal edge of said top deck panel sewn to one of said side edge strips and the remainder of said top deck panel;

feeding an elongated rod generally into the base of the fold defined by the folded portion of said overlying panels and between said side edge strips;

applying an adhesive material in a substantially uninterrupted film between said side edge strips;

pressing said side edge strips together with the adhesive material therebetween to lock said rod in place;

unfolding said remainder of said top deck panel leaving the marginal edge thereof in stacked relation with said side edge strips; and bonding said top deck panel to said one of said side edge strips, whereby said side edge strips cooperate with said rod to define an elongated raised bead which cooperates in turn with an adjacent region of said top deck panel to define an elongated rain drainage gutter.

2. The method of claim 1 wherein said top deck panel and said side quarter panel each include a substantially waterproof outer coating of a heat sealable material, said sewing step placing the outer coatings on said panels in face-to-face, directly abutting relation, and wherein said bonding step comprises a heat sealing step.

3. The method of claim 2 wherein said adhesive material applying step comprises applying a thermally activated adhesive material, said bonding step further including the step of applying heat to said adhesive material to enhance the bond between said side edge strips.

4. The method of claim 1 wherein said adhesive material applying step comprises applying the adhesive material to at least one of the face-to-face surfaces of said directly overlying side edge strips.

5. The method of claim 1 wherein said pressing step comprises pressing the side edge strips together with a reciprocating hammer/anvil unit.

6. A method of making a convertible top or the like having a top deck panel and a side quarter panel each of a fabric-based material with an outer coating formed from a substantially waterproof, heat-sealable material, said method comprising the steps of:

sewing the top deck panel in face-to-face relation with the side quarter panel with a line of stitches near substantially overlying side margins thereof, and with said outer coatings of said panels in direct abutting relation;

folding a portion of the overlying panels along the sewn side margins back upon itself with said side quarter panel defining a directly overlying pair of side edge strips in stacked relation between a marginal edge of said top deck panel sewn to one of said side edge strips and the remainder of said top deck panel;

feeding an elongated rod generally into the base of the fold defined by the folded portion of said overlying panels and between said side edge strips;

applying a thermally activated adhesive material in a substantially uninterrupted film between said side edge strips;

pressing said side edge strips together with the adhesive material therebetween to lock said rod in place;

unfolding said remainder of said top deck panel leaving the marginal edge thereof in stacked relation with said side edge strips, and;

heat sealing by applying heat and pressure to said stacked marginal edge and said side edge strips to bond the stack together, said side edge strips cooperating with said rod to define an elongated raised bead which cooperates in turn with an adjacent region of said top deck panel to define an elongated rain drainage gutter.

7. A system for making a convertible top or the like having a top deck panel and a side quarter panel of fabric-based materials, said system comprising:

means for sewing the top deck panel in face-to-face relation with the side quarter panel generally along substantially overlying side margins of said panels;

means for folding a portion of the overlying panels along the sewn side margins back upon itself with said side quarter panel defining a directly overlying pair of side edge strips in stacked relation between a marginal edge of said top deck panel sewn to one of said side edge strips and the remainder of said top deck panel, said folding means including means for feeding an elongated rod generally into the base of the fold defined by the folded portion of said overlying panels and between said side edge strips;

means for applying an adhesive material in a substantially uninterrupted film between said side edge strips;

means for pressing said side edge strips together to lock said rod in place; and means for bonding said top deck panel marginal edge to said one of said side edge strips, whereby said side edge strips cooperate with said rod to define a raised bead which cooperates in turn, when said remainder of said top deck panel is unfolded from said side quarter panel, with an adjacent region of said top deck panel to define an elongated rain drainage gutter.

8. The system of claim 7 wherein said top deck panel and said side quarter panel each include a substantially waterproof outer coating of a heat sealable material, said outer coatings being placed in direct abutting relation when said panels are sewn together, said bonding means including heat sealing means.

9. The system of claim 8 wherein said adhesive material comprises a thermally activated adhesive material.

10. The system of claim 7 wherein said folding means comprises a folding fixture including a baseplate, an upper guide vane joined to one side of said baseplate and folded back upon said baseplate, and an intermediate guide vane joined to the side of said upper vane opposite said baseplate and being folded back beneath said upper vane, said baseplate and said vanes defining a longitudinally open, generally U-shaped cavity for passage of said panels with said portion of the sewn side margins of said panels folded back upon itself to fit through said cavity.

11. The system of claim 10 wherein said folding fixture further defines a rod passage having an inlet end for receiving the elongated rod and an outlet end through which said rod is fed generally into the base of the fold between said side edge strips upon passage of said folded portion of the panels through said fixture cavity.

12. The system of claim 11 wherein said adhesive material applying means comprises an adhesive material feed foot for delivering the adhesive material between said side edge strips.

13. The system of claim 12 wherein said pressing means comprises a reciprocating hammer/anvil unit.

14. The system of claim 13 wherein said hammer/anvil unit comprises a reciprocating hammer movable between a closed position pressing said side edge strips between said hammer and anvil, and an open position, said hammer and anvil being movable together in a first direction with said hammer in the closed position to draw said panels through said folding fixture and a second opposite direction with said hammer in the open position.

15. The system of claim 9 wherein said bonding means comprises means for applying heat and pressure to said top deck panel marginal edge and said side edge strips.

16. A system for making a convertible top or the like having a top deck panel and a side quarter panel each of a fabric-based material with an outer coating formed from a substantially waterproof, heat sealable material, said system comprising:
    means for sewing the top deck panel in face-to-face relation with the side quarter panel generally along substantially overlying side margins of said panels and with said outer coating of said panels in direct abutting relation;
    means for folding a portion of the overlying panels along the sewn side margins back upon itself with said side quarter panel defining a directly overlying pair of side edge strips in stacked relation between a marginal edge of said top deck panel sewn to one of said side edge strips and the remainder of said top deck panel, said folding means including means for feeding an elongated rod generally into the base of the fold defined by the folded portion of said overlying panels and between said edge strips;
    means for applying a thermally activated adhesive material in a substantially uninterrupted film between said side edge strips;
    means for pressing said side edge strips together to lock said rod in place; and
    heat sealing means for applying heat and pressure to said stacked marginal edge and said side edge strips to bond the stack together, said side edge strips cooperating with said rod to define an elongated raised bead which cooperates in turn with an adjacent region of said top deck panel to define an elongated rain drainage gutter.

17. The system of claim 16 wherein said folding means comprises a folding fixture including a baseplate, an upper guide vane joined to one side of said baseplate and folded back upon said baseplate, and an intermediate guide vane joined to the side of said upper vane opposite said baseplate and being folded back beneath said upper vane, said baseplate and said vanes defining a longitudinally open, generally U-shaped cavity for passage of said panels with said portion of the sewn side margins of said panels folded back upon itself to fit through said cavity, said folding fixture further defining a rod passage having an inlet end for receiving the elongated rod and an outlet through which said rod is fed generally into the base of the fold between said side edge strips upon passage of said folded portion of the panels through said fixture cavity.

18. A folding fixture for folding the side margin of a panel formed from a fabric-based material, comprising:
    a baseplate;
    an upper guide vane joined to one side of said baseplate and folded back upon said baseplate;
    an intermediate guide vane joined to the side of said upper vane opposite said baseplate and folded back beneath said upper vane in spaced relation therewith and in spaced relation with said baseplate, whereby said baseplate and said vanes define a longitudinally open, generally U-shaped cavity for passage of a folded-over side margin of said panel; and
    means for feeding an elongated rod generally into the base of the fold defined by said panel.

19. The folding fixture of claim 18 wherein said feeding means comprises a rod passage formed in said intermedite vane and having an inlet end for receiving said rod and an outlet end through which said rod is fed generally into the base of said fold.

20. The folding fixture of claim 19 further including means for attaching the folded over portions of said panel to lock said rod in place.

* * * * *

UNITED STATES PATENT AND TRADEMARK OFFICE
CERTIFICATE OF CORRECTION

PATENT NO. : 4,684,419

DATED : August 4, 1987

INVENTOR(S) : Roy P. Agosta

It is certified that error appears in the above-identified patent and that said Letters Patent is hereby corrected as shown below:

Change the issue date on the title page from "July 4, 1987" to --August 4, 1987--.

This Certificate applies to the Grant only.

Signed and Sealed this

Twelfth Day of January, 1988

Attest:

DONALD J. QUIGG

*Attesting Officer*     *Commissioner of Patents and Trademarks*